(12) United States Patent
Howard et al.

(10) Patent No.: US 6,697,466 B2
(45) Date of Patent: Feb. 24, 2004

(54) AUDIO STATUS COMMUNICATION FROM AN EMBEDDED DEVICE

(75) Inventors: Michael L. Howard, Sandy, UT (US); William R. Harper, Jr., Salt Lake City, UT (US); Todd H. Rytting, West Valley City, UT (US)

(73) Assignee: emWare, Inc., Salt Lake City, UT (US)

( * ) Notice: Subject to any disclaimer, the term of this patent is extended or adjusted under 35 U.S.C. 154(b) by 23 days.

(21) Appl. No.: 10/092,415

(22) Filed: Mar. 5, 2002

(65) Prior Publication Data

US 2003/0169862 A1 Sep. 11, 2003

(51) Int. Cl.$^7$ ............................................ H04M 11/00
(52) U.S. Cl. .............................. 379/93.37; 379/106.01; 379/93.26
(58) Field of Search ........................ 379/106.01, 102.01, 379/102.02, 102.03, 102.07, 90.01, 110.01, 39, 40, 93.26, 93.37; 340/679

(56) References Cited

U.S. PATENT DOCUMENTS

| | | | | |
|---|---|---|---|---|
| 5,311,581 A | * | 5/1994 | Merriam et al. | 379/106.01 |
| 5,729,596 A | * | 3/1998 | Reeder et al. | 379/102.04 |
| 5,774,529 A | * | 6/1998 | Johannsen et al. | 379/106.03 |
| 5,987,105 A | * | 11/1999 | Jenkins et al. | 379/106.01 |
| 5,997,170 A | * | 12/1999 | Brodbeck | 379/90.01 |
| 6,147,601 A | | 11/2000 | Sandelman et al. | 340/506 |
| 6,160,477 A | | 12/2000 | Sandelman et al. | 340/506 |
| 6,211,782 B1 | | 4/2001 | Sandelman et al. | 340/506 |
| 6,327,365 B1 | * | 12/2001 | Kiger, II | 379/93.37 |

OTHER PUBLICATIONS

Austin Energy Web page, "Become a Power Partner with Austin Energy", pp. 1–2, printed Jun. 6, 2001.
Austin Energy Web page, "Honeywell Superstat", p. 1, printed Jun. 6, 2001
Honeywell Web page, "Energy Management", p. 1, printed Jun. 6, 2001.
Honeywell Web page, "Remote Control for Your Home's Heating/Cooling System", pp. 1–2, printed Jun. 6, 2001.
Honeywell Web page, "Honeywell Home Controller Gateway", pp. 1–2, printed Jun. 6, 2001.
Honeywell Web page, Your Home: Performance and Monitoring, pp. 1–3, printed Jun. 6, 2001.
Honeywell Web page, "Home Controller User Guide", Product Release Version 1.0.x, pp. 1–39, Copyright 2000, Honeywell, Inc.

* cited by examiner

Primary Examiner—Stella Woo
(74) Attorney, Agent, or Firm—Madson & Metcalf

(57) ABSTRACT

An embedded device configured to provide an audio status output is disclosed. The embedded device includes a processor, an input button in electronic communication with the processor and a speaker in electronic communication with the processor for outputting an audio output. Memory is used for storing data. An audio output generator is stored in the memory and operates to generate the audio status output. The audio generator receives a generate audio command initiated by a user through use of the input button. The generator then operates to convert the status data to audio output data through use of an audio generation table. The audio output data includes multiple distinct audio signals that are machine-decipherable and that correspond to individual data elements of the status data. The audio output data is provided to the speaker such that the audio output based on the audio output data is generated.

20 Claims, 4 Drawing Sheets

AUDIO STATUS COMMUNICATION FROM AN EMBEDDED DEVICE

TECHNICAL FIELD

This invention relates generally to embedded devices, and is more particularly directed toward systems and methods for providing audio status communications from an embedded device.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

As stated, embedded systems may be used to monitor or control many different systems, resources, products, etc. Sometimes embedded systems do not provide sufficient and/or desirable means for generating feedback which can make it difficult to diagnose problems, to report status information, to verify modifications made, etc. Benefits may be realized if embedded systems were enhanced in their ability to provide outputs.

SUMMARY OF THE INVENTION

An embedded device configured to provide an audio status output is disclosed. The embedded device includes a processor, an input button in electronic communication with the processor and a speaker in electronic communication with the processor for outputting an audio output. Memory is used for storing data. An audio output generator is stored in the memory and operates to generate the audio status output.

The audio generator receives a generate audio command initiated by a user through use of the input button. The generator then operates to convert status data to audio output data through use of an audio generation table. The audio output data includes multiple distinct audio signals that are machine-decipherable and that correspond to individual data elements of the status data. The audio output data is provided to a speaker such that the audio output based on the audio output data is generated.

In an embodiment disclosed herein, the processor may be a microcontroller. As a result, an embodiment of the embedded device may be a microcontroller-based device. Embedded devices may include many other types of devices including, but not limited to, consumer electronics devices such as a television, DVD player, etc.

The audio output may be embodied in various forms to present audible information. For example, the audio output may comprise DTMF tones.

The status data includes information that may be relevant to the device, such as inputs, outputs, parameters, sensor readings, etc. The status data may include dynamic device-specific input/output data. In addition, the status data may include state data. In certain embodiments, the status data may be comprised of individual data elements. In this embodiment, the audio generation table may include an audio translation for each of the individual data elements.

A system is also disclosed for providing an audio status output describing an embedded device to an audio status collector over a communication network. The system includes an embedded device configured to generate the audio status output and an audio status collector. The audio status collector includes an audio decoder for decoding the audio output. A communications module is used by the audio status collector for connecting to and listening on the communication network. An audio decoding table is used by the audio decoder in decoding the audio output.

Embodiments of the system may use various kinds of communication networks. Possible communication networks include, but are not limited to, telephone networks, cellular telephone networks and radio networks.

A method is disclosed for providing an audio status output describing an embedded device to an audio status collector over a communication network. An embedded device configured to generate the audio status output is provided. The embedded device processes inputs to provide status data that describes operation of the embedded device. A user initiates a generate audio command through use of an input button on the embedded device. The status data is converted to audio output data through use of an audio generation table. The audio output data includes a plurality of distinct audio signals that are machine-decipherable and that correspond to individual data elements of the status data. The audio output data is provided to a speaker of the embedded device such that the audio output based on the audio output data is generated. The audio output is then communicated to an audio status collector via the communication network. An audio decoder of the audio status collector decodes the audio output through use of an audio decoding table to obtain the status data.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
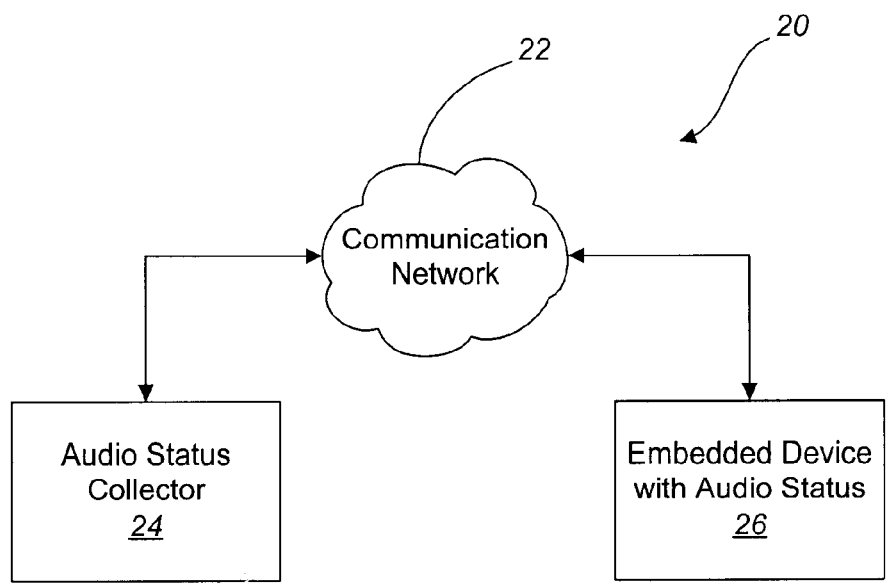
FIG. 1 is a block diagram of an embodiment of a system illustrating the use of an embedded device providing audio status to an audio status collector.

FIG. 1 is a block diagram of an embodiment of a system 20 illustrating the use of an embedded device 26 that provides audio status output to an audio status collector 24 through a communication network 22. The audio status collector 24 receives status reports in the form of audio output from the embedded device 26.

The communication network 22 is a network capable of transmitting sound from one point to another. Typically the communication network 22 is a telephone network, such as the public switched telephone network, a cellular telephone network, a radio network, etc. The embedded device with audio status 26 generates sound that is transmitted via the communication network 22 to the audio status collector 24. An embodiment of the embedded device with audio status 26 may be any kind of embedded electronic device that has been configured to generate an audio status as disclosed herein.

An embodiment of the audio status collector 24 may be a computer configured to listen for the audio generated by the embedded device 26 and also configured to decode the audio. The audio status collector 24 is configured to listen for the audio through use of the communication network 22. Further details of the audio status collector are discussed below.

Figure 2:
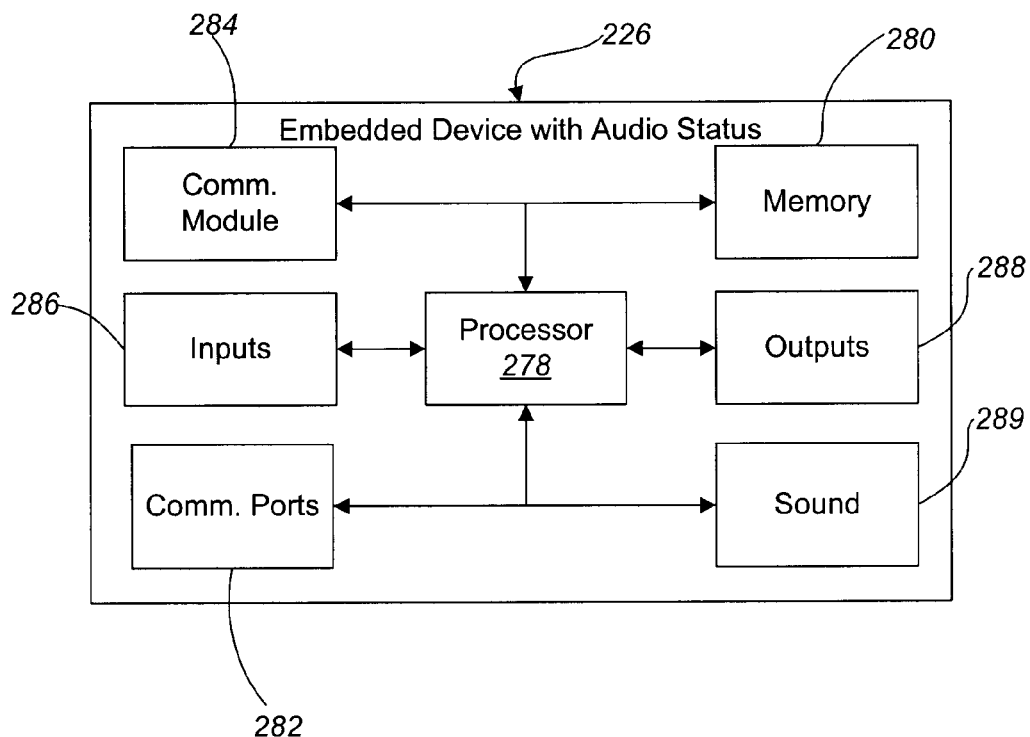
FIG. 2 is a block diagram illustrating hardware components of an embodiment of an embedded device providing audio status.

FIG. 2 is a block diagram illustrating hardware components of an embodiment of an embedded device with audio status 26. The embedded device 26 is any device, appliance, machine, tool, or the like that is capable of receiving and/or sending electronic signals or messages or that may be enabled to receive and/or send electronic signals and that has the ability to generate an audio status output, as described herein. The term "electronic signal" as used herein broadly refers to any electrical signal, electronic signal, electromagnetic signal, wireless signal or other similar signal. Examples of embedded devices 26 include a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like. As shown, many different kinds of embedded devices may be configured to provide an audio status.

An embodiment of an embedded device 26 includes a processor 278 and memory 280. Those skilled in the art will appreciate the various types of processors and memory that can be used. For example, an embodiment of an embedded device 26 may include a single-board computer that includes the processor 278 and memory 280. Such single-board computers are commercially available. Alternatively, the embedded device 26 may include a microcontroller as the processor 278. In addition, embodiments of the embedded device 26 may include flash memory.

The embedded device 26 may also include communications ports 282. The communications ports 282 enable communication with other electronic devices. Those skilled in the art will appreciate the various types of communication ports 282 that can be used with the embodiments herein.

A communications module 284 is included in the embedded device 26 for communications through the communication network 22. Communication modules 284 that are capable of sending and receiving communications through the communication network 22 are commercially available.

The embodiment of FIG. 2 also includes inputs 286 that allow a user to enter user input to the embedded device 26. The inputs 286 may be a set of buttons, switches, sensors, etc. Those skilled in the art will appreciate the various kinds of inputs 286 that can be used for a user to enter user input. Through the inputs 286 the user causes an audio status output to be generated by the embedded device 26. Of course, the inputs 286 may be used for other reasons, such as allowing a user to navigate through menus, causing messages or data to be displayed, entering commands, etc. Other examples of possible inputs 286 include a touch screen, a keyboard, a mouse, a joystick, etc.

An embodiment of an embedded device 26 may also include outputs 288 to present information to the user. For example, messages or information may be displayed to the user on an output device 288, such as a display (not shown). A typical display that may be used is an LCD. Other output devices may also be used. For example, a printer may also be used to print information for the user.

The embedded device 26 includes a sound component 289. The sound component 289 is used to generate audio status output to be heard and decoded by the audio status collector 24. The sound component 289 may generate different tones and/or different frequencies in order to produce an audio status output. To provide the audio status output to the audio status collector 24, the user may simply place the microphone portion of the telephone (not shown) near the sound component 289. The embedded device 26 may then produce various sounds that embody a status report regarding the embedded device 26. The audio status collector 24 may use computer technology to recognize the tones, the tone sequence, frequencies, etc., to receive and decode the audio status output. As a result, the audio status collector 24 may use computer technology to automate its processing of audio status output reports.

The sound component 289 may be used to generate dual-tone multifrequency ("DTMF") audio signals. There are many commercially available hardware and/or software packages available for interpreting DTMF signals. As a result, the audio status collector 24 may simply use commercially available components to interpret the DTMF tones generated by the embedded device 26. In operation, a user may make a telephone call to the audio status collector 24 to provide an audio status report. Once so instructed, the user may hold the microphone portion of the telephone next to the embedded device 26 and simply press a button (not shown) of the inputs 286 to cause an audio status output to be generated. From the audio generated the audio status collector 24 may receive and decode the audio status output.

Many commercially available audio or sound components 289 may be used as the sound component 289 of the embedded device 26. For example, in the embodiment illustrated in FIG. 3, the sound component 289 may be a speaker 389 with supporting speaker components 388 (e.g., a driving circuit). The speaker components 388 may also be a sound card with a speaker jack to which a speaker 389 may be attached. Further, the speaker component 388 and speaker 389 may be embodied in an integrated circuit capable of producing sound. Those skilled in the art will appreciate the commercially available speakers and sound components that may be utilized with the embedded device 326 to produce sound.

Figure 3:
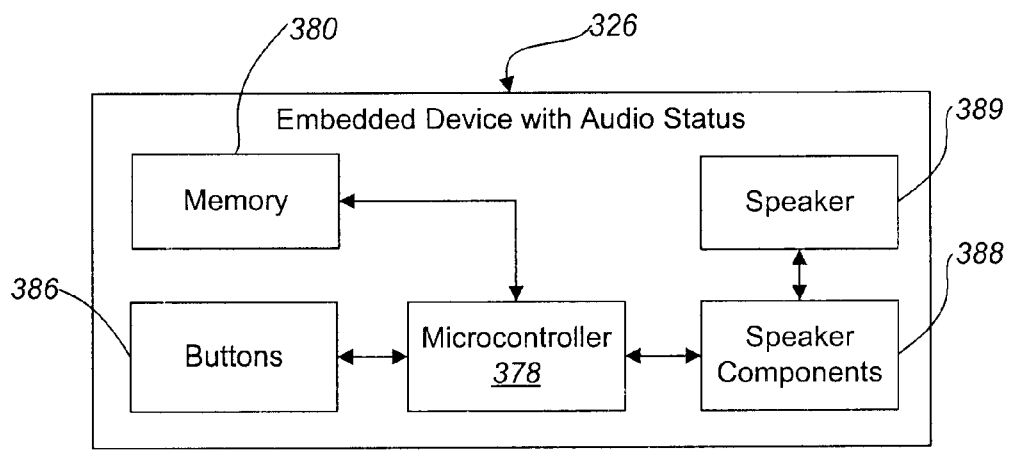
FIG. 3 is a block diagram illustrating hardware components of another embodiment of an embedded device providing audio status.

The embodiment of the embedded device 326 shown in FIG. 3 includes a microcontroller 378 as the processor. Many types of embedded devices 326 currently available include a microcontroller 378 for controlling the embedded device 326. Such embedded devices 326 may be referred to as microcontroller-based devices. Buttons 386 may be used by a user to enter user input. The embedded device 326 of FIG. 3 also illustrates the various modifications that may be made to an embedded device 26 without detracting from the scope of the inventive principles herein.

Figure 4:
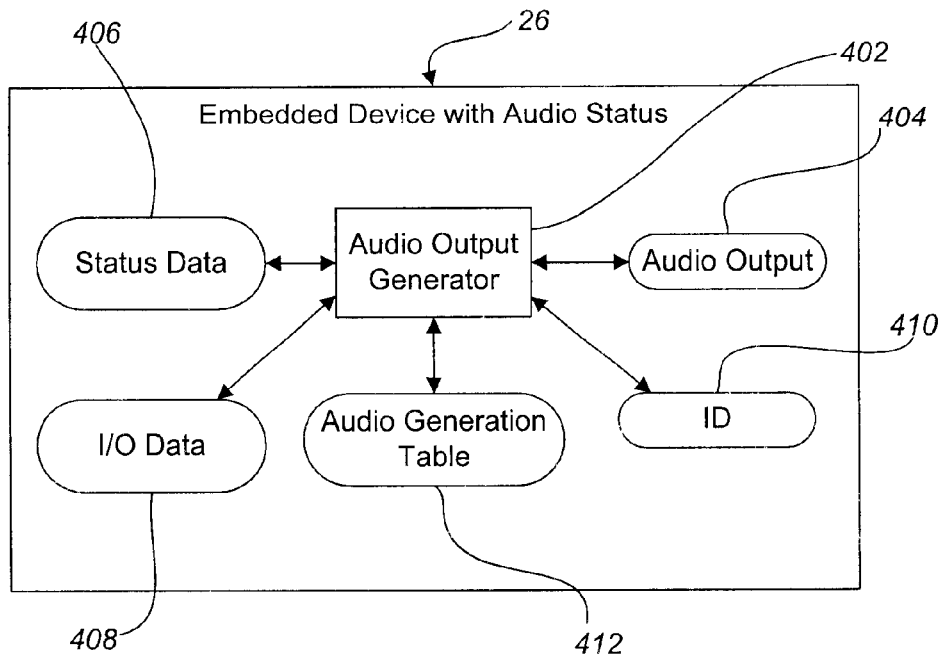
FIG. 4 is a block diagram illustrating software components of an embodiment of an embedded device providing audio status.

FIG. 4 is a block diagram illustrating software components of an embodiment of an embedded device 26. An audio output generator 402 generates the audio output data 404 that is output through the sound component 289 or speaker 389. The audio output generator 402 generates audio output data 404 that serves as an audible status report of the embedded device 26. As a result, the audio output generator 402 translates status data 406 that is not in the form of an audio signal or audio data into the audio output data 404.

The status data 406 includes data that is to be reported via the audio status output. The status data 406 may include state information (what state or states the embedded device 26 is in), transaction records, switch states, sensor readings, operational parameters, etc. In certain embodiments of the embedded device 26, the audio output generator 402 may create the status data 406 by accessing the necessary input/output (I/O) data 408 to extract the information needed to write out the status data 406. The I/O data 408 typically includes parameters and data that are dynamic.

An identification 410 may be stored on the embedded device 26 to identify the particular product, to identify the user of the product, etc. Such identification 410 may be useful for billing purposes, support, analysis, etc. The audio output generator 402 may access the identification 410 and provide a portion of the status data 406 that includes the identification 410.

The audio output generator 402 translates status data 406 into the audio output data 404 through use of an audio generation table 412. The audio generation table 412 serves as a lookup table. In the embedded device 26 in FIG. 4, the status data 406 is comprised of data elements (e.g., numbers, values, letters, digits, etc.) and each data element has an audio data equivalent whereby the status data 406 may be translated into audio output data 404. For example, if the status data 406 were in the form of a number, the audio generation table 412 may include translation values, such as, for example, 0=tone A, 1=tone B, 2=tone C, etc. Each digit may be taken separately and translated into an audio signal. The audio signals taken together comprise the audio output data 404. Of course, multiple tones may be used, frequencies may be used, pulse tones may be used, etc. Those skilled in the art will appreciate the many different ways in which the status data 406 may be converted into audio output data 404 through use of an audio generation table 412.

TABLE 1

| Decimal Value | Audio Signal |
| --- | --- |
| 0 | Tone A |
| 1 | Tone B |
| 2 | Tone C |
| 3 | Tone D |
| 4 | Tone E |
| 5 | Tone F |
| 6 | Tone G |
| 7 | Tone H |
| 8 | Tone I |
| 9 | Tone J |

An example of audio output data 404 generation will be described. Table 1 illustrates one possible audio generation table 412. As shown in Table 1, the table includes a translation table for decimal values from 0 to 9. For this example, the status data 406 is treated as a decimal number. For the sake of clarity and simplicity, assume that the status data 406 is the number 9792. Using the sample audio generation table 412, this number would translate into Tone J-Tone H-Tone J-Tone C. An audio generation table 412 may be used for binary values, for hexadecimal values, for ASCII values, etc. In addition, the values to be translated may translate into frequencies, multiple tones, pulses, etc. Table 2, below, illustrates a further example of a possible audio generation table 412.

TABLE 2

| Hexadecimal Value | Audio Signal |
| --- | --- |
| 0 | Frequency A |
| 1 | Frequency B |
| 2 | Frequency C |
| 3 | Frequency D |
| 4 | Frequency E |
| 5 | Frequency F |
| 6 | Frequency G |
| 7 | Frequency H |
| 8 | Frequency I |
| 9 | Frequency J |
| A | Frequency K |
| B | Frequency L |
| C | Frequency M |
| D | Frequency N |
| E | Frequency O |
| F | Frequency P |

As shown in Table 2, the table includes a translation table for hexadecimal values from 0 to F. For this example, the status data 406 is treated as a hexadecimal number. For the sake of clarity and simplicity, assume that the status data 406 is the hexadecimal number FF93. Using the sample audio generation table 412, this number may translate into Frequency P-Frequency P-Frequency J-Frequency D. In this example, the audio output generator 402 would access the status data 406 of FF93 and, using the audio generation table 412, would translate this into an audio output 404 that would produce Frequency P-Frequency P-Frequency J-Frequency D. When a user entered the input to generate the audio status, the audio generated would be Frequency P-Frequency P-Frequency J-Frequency D. This audio output would be heard and decoded by the audio status collector 24.

Depending on the size of the status data 406 and the particular implementation, the status data 406 may be broken up into smaller components before it is translated into audio output data 404. For example, the entire status data 406 may be used to identify a particular audio signal to assign to the audio output data 404. More commonly the status data 406 may be broken up into smaller components or smaller data elements where each smaller component's value corresponds to an audio signal. The examples shown in Tables 1 and 2 are examples where the status data 406 is broken up into individual data elements and then translated into individual audio signals that are then output together in a sequential order. The plurality of individual audio signals may be output simultaneously if the audio status collector 24 has the ability to decode the audio status when output in this fashion.

Figure 5:
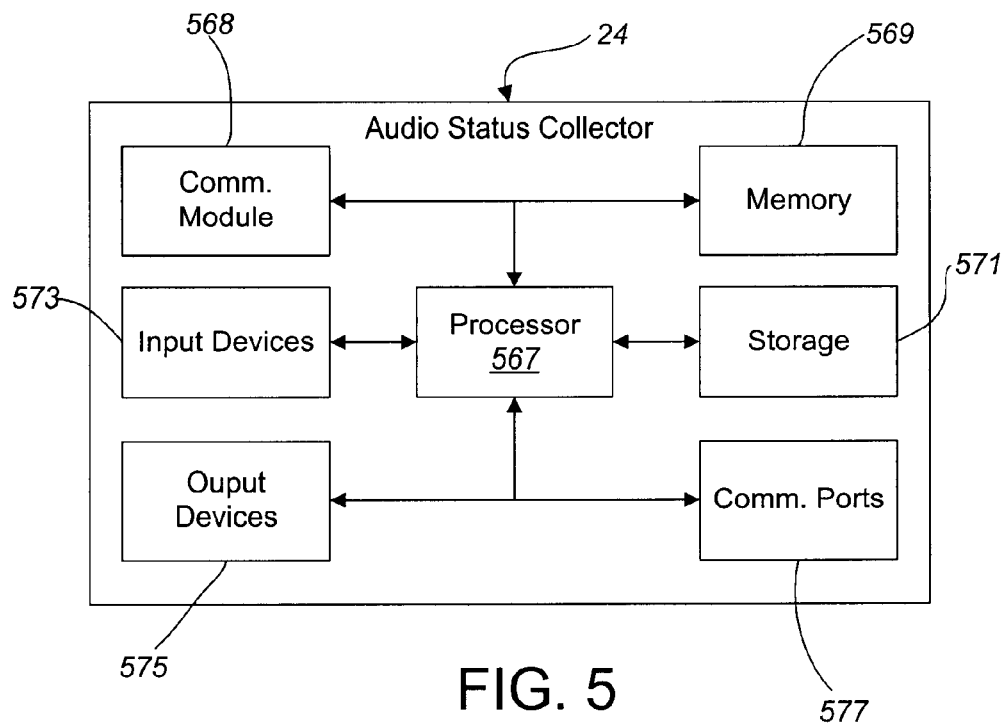
FIG. 5 is a block diagram illustrating hardware components of an embodiment of an audio status collector.

FIG. 5 is a block diagram of hardware components that may be used in an embodiment of an audio status collector 24. An embodiment of the audio status collector 24 may be a computer configured to listen for the audio generated by the embedded device 26 and also configured to decode the audio. The audio status collector 24 is configured to listen for the audio through use of the communication network 22.

As stated, a computer may be used to implement the audio status collector 24. Many different types of computer systems may be used to implement the audio status collector 24. The diagram of FIG. 5 illustrates typical components of a computer system including a processor 567, memory 569, a storage device 571, input devices 573 and output devices 575. One or more communication ports 577 may also be included in the audio status collector 24 computer. It will be appreciated by those skilled in the art that many more components may be included in the computer. For example, various input devices 573 may be included, such as a keyboard, a mouse, a joystick, a touchscreen, etc. In addition, various output devices may be included such as a monitor, speakers, a printer, etc. Thus, those skilled in the art will appreciate that many additional components may be added to the audio status collector 24 without detracting from the functionality to serve as an audio status collector 24.

The communications module 568 is used to communicate with the embedded device 26. The communications module 568 operates to connect to the communication network 22 and to listen for and process the audio generated by the embedded device 26. Various commercially available products exist that may be used with the audio status collector 24. For example, a telephone card (not shown) configured to decode DTMF tones may be used. In addition, a telephone card in combination with audio processing software (not shown) may be used. By way of further example, a simple microphone (not shown) may be used to detect the audio output and audio processing software (not shown) may be used to decode the audio output from the embedded device 26.

Figure 6:
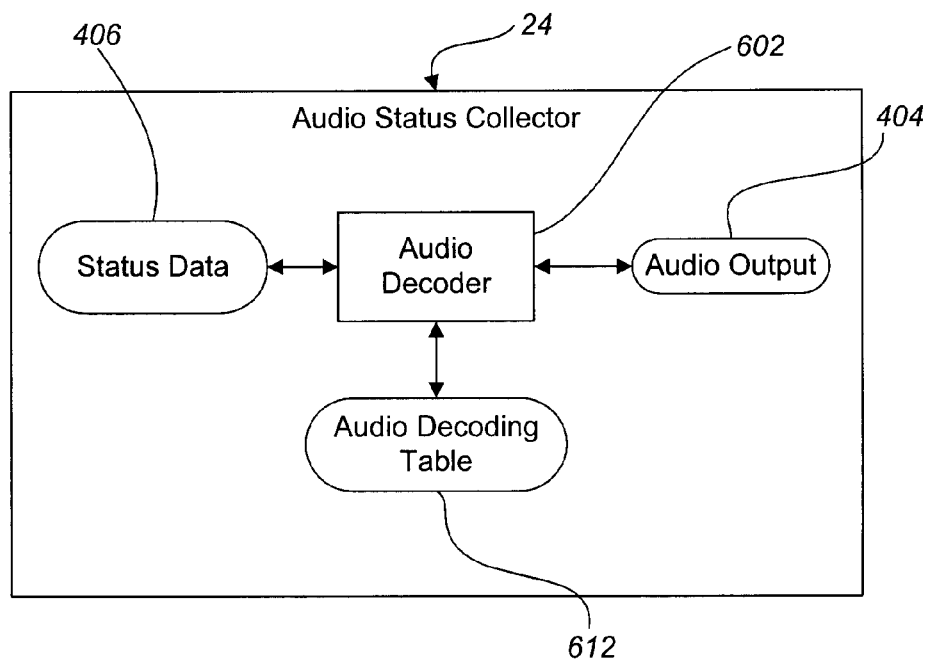
FIG. 6 is a block diagram illustrating software components of an embodiment of an audio status collector.

FIG. 6 illustrates components of an embodiment of an audio status collector 24 that may be implemented through software and/or stored data on the storage 571 or memory 569 of the audio status collector 24. An audio decoder 602 handles receiving and decoding the audio output 404 from the communication network 22. As discussed above, there are many commercially available products that may be used to listen for and decode the audio output 404.

The audio decoder 602 translates the audio output 404 back into status data 406 using an audio decoding table 612. The audio decoding table 612 may be similar to the audio generation table 412 to enable the audio decoder 602 to look up each audio output component received and translate it into its equivalent piece of data to thereby rebuild the status data 406.

Figure 7:
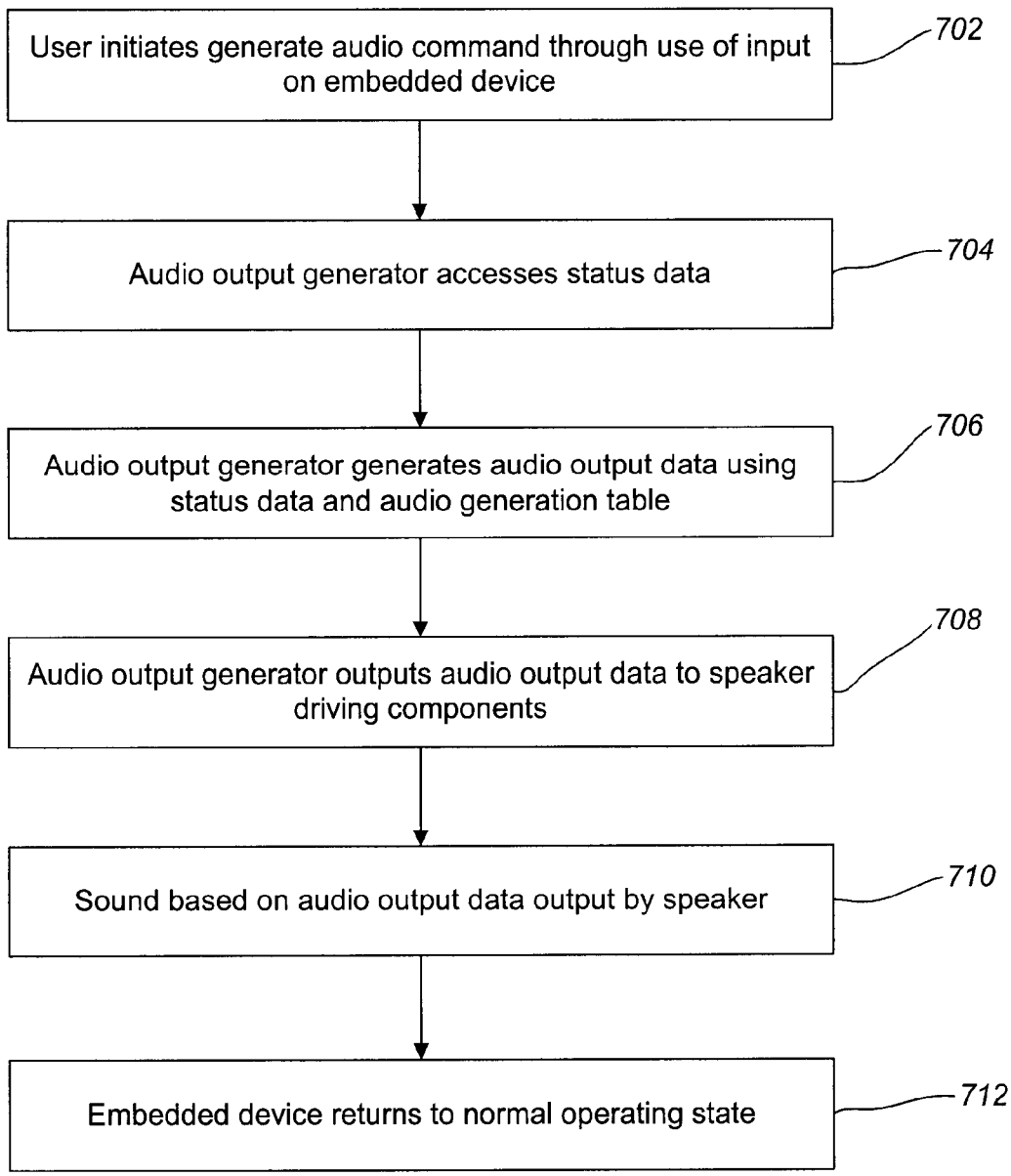
FIG. 7 is a flow diagram of a method for providing an audio status output from an embedded device to an audio status collector.

FIG. 7 is a flow diagram of a method for providing an audio status output from an embedded device. A user initiates 702 a generate audio command through use of an input or inputs on the embedded device 26. The audio output generator 402 then accesses 704 the status data 406. Using the audio generation table 412 and the status data 406, the audio output generator 402 generates 706 audio output data 404. The audio output generator 402 then outputs 708 the audio output data 404 to the speaker driving components 388. Sound based on the audio output data 404 is then output 710 by the speaker 389. After the embedded device 26 has finished outputting the audio output data 404, it returns 712 to its normal operating state.

Embodiments disclosed herein may be used in a variety of contexts. The following examples of uses for the embodiments disclosed herein are only meant as illustrative and the scope of the invention claimed below is not limited to these exemplary embodiments. In one embodiment, a television may be configured as an embedded device with audio status to assist maintenance and support of the television. When the user calls the television manufacturer for support, the user may be asked to simply press a button that causes an audio status output and to hold the telephone up to the television speaker. The television manufacturer may use an audio status collector 24 to decode the audio status output and make certain determinations about the television's status. Similarly, many other consumer electronic devices may be configured as embedded devices 26 with audio status, such as compact disc players, digital video disc players, video cameras, video cassette recorders, radio receivers, tape decks, etc. Furthermore, other electronic systems may be configured as disclosed herein, including thermostats, furnaces, air conditioning systems, refrigerators, telephones, typewriters, automobiles, vending machines, etc.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An embedded device configured to provide an audio status output, the embedded device comprising:
   a processor;
   an input button in electronic communication with the processor;
   a speaker in electronic communication with the processor for outputting an audio output;
   memory in electronic communication with the processor for storing data; and audio output generator instructions stored in the memory and implementing a method comprising:
- receiving a generate audio command initiated by a user through use of the input button in electronic communication with the processor;
- accessing status data stored in the memory;
- converting the status data to audio output data through use of an audio generation table, the audio output data comprising a plurality of distinct audio signals that are machine-decipherable and that correspond to individual data elements of the status data; and
- providing the audio output data to the speaker such that the audio output based on the audio output data is generated.

2. The embedded device as defined in claim 1, wherein the embedded device is a microcontroller-based device.

3. The embedded device as defined in claim 1, wherein the audio output comprises DTMF tones.

4. The embedded device as defined in claim 1, wherein the status data includes dynamic device-specific input/output data.

5. The embedded device as defined in claim 1, wherein the status data includes state data.

6. The embedded device as defined in claim 1, wherein the status data is comprised of individual data elements, and wherein the audio generation table includes an audio translation for each of the individual data elements.

7. The embedded device as defined in claim 1, wherein the embedded device is a television.

8. The embedded device as defined in claim 1, wherein the embedded device is a consumer electronics device.

9. A system for providing an audio status output describing an embedded device to an audio status collector over a communication network, the system comprising:
- an embedded device configured to generate the audio status output comprising:
  - a processor;
  - an input button in electronic communication with the processor;
  - a speaker in electronic communication with the processor for outputting an audio output;
  - memory in electronic communication with the processor for storing data; and
  - audio output generator instructions stored in the memory and implementing a method comprising:
    - receiving a generate audio command initiated by a user through use of the input button in electronic communication with the processor;
    - accessing status data stored in the memory;
    - converting the status data to audio output data through use of an audio generation table, the audio output data comprising a plurality of distinct audio signals that are machine-decipherable and that correspond to individual data elements of the status data; and
    - providing the audio output data to the speaker such that the audio output based on the audio output data is generated; and
- an audio status collector comprising:
  - an audio decoder for decoding the audio output;
  - a communications module for connecting to and listening on the communication network, the communications module in electronic communication with the audio decoder; and
  - an audio decoding table for use by the audio decoder in decoding the audio output, whereby the audio decoder hears the audio output and decodes the audio output to obtain the status data.

10. The system as defined in claim 9, wherein the embedded device is a microcontroller-based device.

11. The system as defined in claim 9, wherein the audio output comprises DTMF tones.

12. The system as defined in claim 9, wherein the status data includes dynamic device-specific input/output data.

13. The system as defined in claim 9, wherein the status data includes state data.

14. The system as defined in claim 9, wherein the status data is comprised of individual data elements, and wherein the audio generation table includes an audio translation for each of the individual data elements.

15. A method for providing an audio status output describing an embedded device to an audio status collector over a communication network, the method comprising:
- providing an embedded device configured to generate the audio status output;
- processing inputs of the embedded device to provide status data that describes operation of the embedded device;
- receiving a generate audio command initiated by a user through use of an input button of the embedded device in electronic communication with a processor of the embedded device;
- accessing the status data stored in memory of the embedded device;
- converting the status data to audio output data through use of an audio generation table, the audio output data comprising a plurality of distinct audio signals that are machine-decipherable and that correspond to individual data elements of the status data, wherein the converting is performed by audio output generator instructions stored in memory; and
- providing the audio output data to a speaker of the embedded device such that the audio output based on the audio output data is generated, wherein the providing is performed by the audio output generator instructions stored in the memory;
- communicating the audio output to an audio status collector via the communication network; and
- decoding the audio output by an audio decoder of the audio status collector through use of an audio decoding table to obtain the status data.

16. The method as defined in claim 15, wherein the embedded device is a television.

17. The method as defined in claim 15, wherein the embedded device is a consumer electronics device.

18. The method as defined in claim 15, wherein the communication network is a telephone network.

19. The method as defined in claim 15, wherein the communication network is a cellular telephone network.

20. The method as defined in claim 15, wherein the communication network is a radio network.

* * * * *